United States Patent [19]
Simas et al.

[11] Patent Number: 5,868,003
[45] Date of Patent: Feb. 9, 1999

[54] APPARATUS FOR PRODUCING FINE SNOW PARTICLES FROM A FLOW LIQUID CARBON DIOXIDE

[75] Inventors: Luis Simas, Palos Park; George Rhoades, La Grange; Steve McCarty, Glendale Heights, all of Ill.

[73] Assignee: Praxair Technology, Inc., Danbury, Conn.

[21] Appl. No.: 891,760

[22] Filed: Jul. 14, 1997

[51] Int. Cl.[6] .................................................. F25J 1/00
[52] U.S. Cl. ................................................................ 62/603
[58] Field of Search ............................ 62/50.5, 52.1, 62/603

[56] References Cited

U.S. PATENT DOCUMENTS

| | | | |
|---|---|---|---|
| 1,586,029 | 5/1926 | Cremieu | 62/602 |
| 2,375,646 | 5/1945 | Grossi | 62/511 |
| 2,452,441 | 10/1948 | Dube | 62/511 |
| 3,181,305 | 5/1965 | Schoenfelder | 62/908 |
| 3,295,563 | 1/1967 | Laya et al. | 141/1 |
| 3,296,809 | 1/1967 | Feuerstein | 62/50.5 |
| 3,443,389 | 5/1969 | Townsend et al. | 62/603 |
| 3,667,242 | 6/1972 | Kilburn | 62/10 |
| 3,866,428 | 2/1975 | Simonet et al. | 62/908 |
| 4,111,362 | 9/1978 | Carter, Jr. | 239/1 |
| 4,145,894 | 3/1979 | Frank et al. | 62/344 |
| 4,376,511 | 3/1983 | Franklin, Jr. | 239/14 |
| 4,462,423 | 7/1984 | Franklin, Jr. | 137/561 |
| 4,640,460 | 2/1987 | Franklin, Jr. | 239/2.2 |
| 4,796,434 | 1/1989 | Garnreiter | 62/50.5 |
| 5,020,330 | 6/1991 | Rhoades et al. | 62/63 |
| 5,040,374 | 8/1991 | Micheau | 62/52.1 |

Primary Examiner—Ronald Capossela
Attorney, Agent, or Firm—Bharat C. Gandhi

[57] ABSTRACT

A system for producing a flow of fine snow particles includes a conduit for providing a pressurized flow of a cryogenic liquid and a nozzle coupled to the conduit, the nozzle having an outlet and an inlet pathway in communication with the conduit. An expansion member is positioned within a the nozzle and covers the inlet pathway. The expansion member provides multiple fine channels for passage of the cryogenic fluid into a region of lower pressure, thereby enabling expansion of the cryogenic fluid during passage through the expansion member. In a preferred embodiment, the cryogenic fluid is carbon dioxide and the system parameters are set to enable the cryogenic fluid to enter a solid phase at or near the outlet surface of the expansion member and to exit therefrom as a fine snow particulate.

13 Claims, 7 Drawing Sheets

| INTERMEDIATE PRESSURE CHAMBER SLOT WIDTH | POROUS INSERT DIAMETER | FLOW RATE #/MIN | INTERMEDIATE PRESSURE CHAMBER PRESSURE |
|---|---|---|---|
| 0.022" | 1/8 | 0.48 | 4.53 |
| 0.022" | 5/32 | 0.82 | 11.63 |
| 0.022" | 3/16 | 1.08 | 18.65 |
| 0.022" | 7/32 | 1.25 | 33.0 |

SLOT ANGLE 45°
SLOT AREA: .010256 SQ. IN.
POROUS INSERT: 1/16" THICK
5 MIL PORES
INLET PRESSURE: 295 psi

FIG. 8

| INTERMEDIATE PRESSURE CHAMBER SLOT WIDTH | POROUS INSERT DIAMETER | FLOW RATE #/MIN | INTERMEDIATE PRESSURE CHAMBER PRESSURE |
|---|---|---|---|
| 0.035" | 1/8 | 0.50 | 0.75 |
| 0.035" | 5/32 | 0.78 | 3.25 |
| 0.035" | 3/16 | 1.02 | 5.75 |
| 0.035" | 7/32 | 1.26 | 9.75 |

SLOT ANGLE 45°
SLOT AREA: .014916 SQ. IN.
POROUS INSERT: 1/16" THICK
5 MIL PORES
INLET PRESSURE: 295 psi

FIG. 9

| INTERMEDIATE PRESSURE CHAMBER SLOT WIDTH | POROUS INSERT DIAMETER | FLOW RATE #/MIN | INTERMEDIATE PRESSURE CHAMBER PRESSURE |
|---|---|---|---|
| 0.062" | 1/8 | 0.50 | 0.00 |
| 0.062" | 5/32 | 0.82 | 1.00 |
| 0.062" | 3/16 | 1.00 | 1.50 |
| 0.062" | 7/32 | 1.26 | 3.25 |

SLOT ANGLE   45°
SLOT AREA:   .029196 SQ. IN.
POROUS INSERT: 1/16" THICK
              5 MIL PORES
INLET PRESSURE: 295 psi

FIG. 10

APPARATUS FOR PRODUCING FINE SNOW PARTICLES FROM A FLOW LIQUID CARBON DIOXIDE

FIELD OF THE INVENTION

This invention relates to an apparatus for producing finely divided cryogenic snow particles and, more particularly, to an improved nozzle structure for receiving a flow of liquid carbon dioxide and providing a flow of fine carbon dioxide snow particles therefrom.

BACKGROUND OF THE INVENTION

Snow particles produced from carbon dioxide are used in a wide variety of cooling and freezing applications. Carbon dioxide snow particles may be used, for instance, in refrigeration, for process cooling and freezing, as well as in the production of dry ice. More particularly, such snow particles are useful in both food and non-food applications, such as for example, in food cooling, freezing and refrigeration, and for rapid and/or spot cooling during the processing of various non-food materials.

Carbon dioxide snow particles are typically produced by rapid expansion of liquid carbon dioxide through a small orifice. The liquid carbon dioxide is obtained by compressing carbon dioxide gas and maintaining it under proper pressure and temperature conditions for refrigeration. In bulk storage tanks, for example, carbon dioxide stored at a pressure of approximately 300 lbs. per square inch and a temperature of about 0° F. is in the form of a liquid. At the point of use, the liquid carbon dioxide is converted to a mixture of carbon dioxide snow and vapor by rapid expansion through a small orifice.

Prior art apparatuses for the production of carbon dioxide snow-making employ relatively simple orifices to enable an expansion to occur of the carbon dioxide liquid feed. However, typically, prior art expansion device/nozzles such as snow horns and orifices, create a spot impingement pattern, and are bulky and difficult to fit into small spaces. These prior art device/nozzles are also known to thrust the snow particles out of the snow horns and orifices at a high velocity. The high velocity of the carbon dioxide snow creates difficulty in applying an even snow blanket and can damage fragile items, such as cheese toppings on pizza or whipped toppings on bakery items. Furthermore, when used in process cooling applications, the high velocity can cause pitting on the surface, or even breakage, of fragile materials such as coated barrier materials. Moreover, the high velocity output of snow particles creates high noise levels that arise safety and environmental concerns with respect to personnel working in the vicinity.

Attempts have been tried to overcome the uneven application of carbon dioxide snow. For instance, specially shaped horns have been provided at the exit of an expansion orifice; fixed orifices have been used which discharge against a bounce plate; variable orifices have been used which discharge into closed containers and combinations of the above have all been attempted.

For instance, U. S. Pat. No. 3,667,242 to Kilburn describes a structure for producing carbon dioxide snow where liquid carbon dioxide is directed into an upper portion of a hollow, double-side-walled cylindrical horn which is provided with an open bottom and a closed top. A nozzle in the upper-most portion of the cylindrical horn imparts a swirling tangential movement to the snow formed in the horn.

U.S. Pat. No. 4,111,362 to Carter, Jr. describes a carbon dioxide snow making nozzle arrangement wherein pairs of carbon dioxide jets are transversely arranged so as to inject carbon dioxide into a horn region. The expanding jet mixtures of snow and vapor are directed into collision paths and thereby dissipate the energy of the jets.

U.S. Pat. No. 4,145,894 to Frank et al. describes a carbon dioxide snow production apparatus wherein liquid carbon dioxide is directed into a chamber through a nozzle. The resultant snow is dispersed by a motor driven drum with brush-like blades which pick up the snow and deposit it onto articles being moved along a conveyor belt.

U.S. Pat. No. 4,376,511 to Franklin, Jr. describes a carbon dioxide snow forming device wherein a manifold is positioned within a channel member and carbon dioxide snow is dispensed towards the sides of the channel member, thereby causing some of the kinetic energy of the carbon dioxide snow to be dissipated.

U.S. Pat. No. 4,462,423 to Franklin, Jr. describes a carbon dioxide snow-forming header wherein plural nozzles are positioned along a header pipe to enable plural dispensing regions for carbon dioxide snow along the header.

U.S. Pat. No. 4,640,460 to Franklin, Jr., describes a carbon dioxide snow-forming header wherein a pair of nozzles are provided within a tank. A supply of liquid carbon dioxide at approximately 300 psi is fed to the inlet ends of the nozzles. In addition, liquid carbon dioxide is applied to the inlet ends of the nozzle through a supply line so as to chill the supply line to an extent sufficient to reduce the temperature of the liquid carbon dioxide being supplied to the triple-point.

U.S. Pat. No. 5,020,330 to Rhoades et al., describes a food freezer which includes one or more nozzles for directing carbon snow particles onto food products. The liquid carbon dioxide is piped so that it flows only upwardly and/or horizontally toward the spray nozzles. Thus, any solid carbon dioxide that may accumulate adjacent the upstream side of the orifices is melted by carbon dioxide vapor which gravitates upward in the piping.

There is a need for carbon dioxide snow dispensing heads and nozzles which produce a fine particulate snow, wherein high velocity snow particles are avoided. Further, such devices should produce carbon dioxide snow particles of relatively constant particle dimensions so as to assure a relatively even application of the particles across food or other products or materials being cooled.

Accordingly, it is an object of this invention to provide an improved nozzle structure for production of fine carbon dioxide snow particles.

It is another object of this invention to provide an improved structure for providing finely divided carbon dioxide snow particles wherein nozzle blockage by solidified carbon dioxide particles is avoided.

SUMMARY OF THE INVENTION

A system for producing a flow of fine snow particles includes a conduit for providing a pressurized flow of a cryogenic fluid and a nozzle coupled to the conduit, the nozzle having an outlet and an inlet pathway in communication with the conduit. An expansion member is positioned within the nozzle and covers the outlet pathway. The expansion member provides multiple fine diameter channels for passage of the cryogenic fluid into a region of lower pressure, thereby enabling expansion of the cryogenic fluid during passage through the expansion member. In a preferred embodiment, the cryogenic fluid is carbon dioxide and the system parameters are set to enable the carbon dioxide fluid to enter a solid and vapor phase at or near the outlet surface of the expansion member and the solid phase to exit therefrom as a fine snow particulate.

The system of the present invention is contemplated for use as a replacement for any existing snow-forming devices. Accordingly, as contemplated, the instant invention may be used separately, as an individual device, such as for example, in place of a snow horn or spot cooling device, or as part of an overall system such as may be used in a food freezer, refrigerator, or belt snower. Those skilled in the art will recognize that the instant invention is not limited to any particular use and may be used in any application in which the use of a cryogen for refrigeration, cooling or freezing is desired.

The present inventors specifically contemplate that the instant invention may be used in a variety of food cooling, freezing, and refrigeration applications including, but not limited to, belt snowers, food freezers, and food refrigerators. For example, in the processing of frozen ground foods, such as frozen ground meats, the raw meat must be quickly cooled following grinding (since grinding inherently adds a certain amount of heat to the product) before it is packaged and frozen. The present invention may advantageously be used for this purpose since it creates fine snow particles that may be continuously deposited, in a controlled manner, on the ground meat as it exits the grinder. The present invention, when used in such a processing plant where personnel work in close proximity to equipment, has the added advantage of low noise since the snow is delivered without a high velocity output.

The present invention may also be used, for example, in food refrigerators and food freezers where there is direct contact between the food and the cryogen. The present invention can be used in such equipment since many commercial freezers and refrigerators use existing snow creating devices. The advantage with the present system is in the creation of fine snow particles that provide increased heat transfer due to their ability to make greater surface contact with the food.

It is further contemplated that the present invention may be used in any process cooling application, such as may be needed in the manufacturing of coated materials or materials made from molten or semi-molten feedstocks. For example, asphalt barrier materials are produced by coating hot asphalt onto a substrate. Following coating, the barrier material must be cooled evenly over their entire surface before further processing to prevent gumming of the process system. This is traditionally accomplished by cooling off-line. This makes it difficult to process such materials continuously. However, by using the present invention, fast, efficient and continuous cooling may be obtained since the present invention provides a fine particulate snow that can be applied evenly over the entire surface of a material.

Accordingly, the present invention provides a versatile system for producing a flow of fine snow particles that may be used in a wide variety of cooling, refrigeration, and freezing applications in the food and non-food industries.

BRIEF DESCRIPTION OF THE DRAWINGS

FIGS. 8–10 are charts which note results obtained from tests of the nozzle shape shown in FIG. 4, with the nozzle of FIG. 8 having a slot width of 0.022", FIG. 9—0.035" and FIG. 10—0.062".

DETAILED DESCRIPTION OF THE INVENTION

Figure 1:
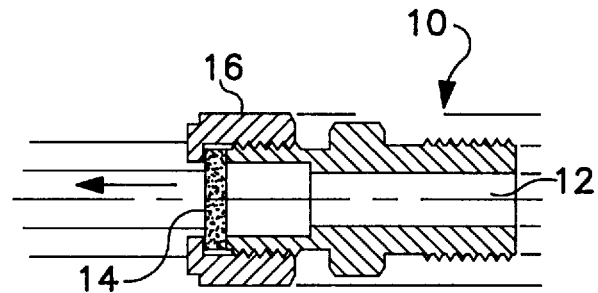
FIG. 1 is a sectional view of a first embodiment of a nozzle incorporating the invention hereof.

Each of the nozzle arrangements hereafter to be described includes an expansion member, or other member having multiple fine channels through it, which occludes the cryogenic fluid pathway and provides multiple expansion channels. Within the expansion channels, expansion of the cryogenic fluid occurs and conversion of the expanding cryogenic fluid (if carbon dioxide) to a snow particulate and vapor.

The preferred material for the expansion member is sintered, or micro-drilled, stainless steel, however, any material which provides multiple porous channels or microchannels for passage of a cryogenic fluid into a region of lower pressure is acceptable. The expansion material must have multiple paths for expansion of the cryogenic fluid so that, in combination with a pressure gradient thereacross, the cryogenic fluid, if carbon dioxide, is converted into vapor and a fine snow particulate which exits from the expansion insert at a lower velocity than would occur if the pressure drop for the same flow was created by a single hole orifice. The term expansion material, as used hereafter, will include, as their base materials, metals, ceramics, glasses, plastics, composites, screen(s), "steel wool" arrangements and all materials of fabrication of the aforesaid materials.

Stainless steel sintered porous products can be obtained from the Mott Metallurgical Corporation, Farmington Industrial Park, 84 Spring Lane, Farmington, Conn. The porous inserts can be fabricated into various thicknesses and diameters and may be specified, as to porosity, e.g., from 0.2 to 100 microns, in various gradations, and preferably from about 5 to about 20 microns. The shape and pore size of the porous insert may vary in accordance with the application and structure of the nozzle. For example, a 5 micron porosity insert will create less snow per unit of area than a 10 micron porosity insert of equal surface area. If the process requires a circular pattern, a disk may be used. If a fan snow pattern is required, then a disk or cap with a fan-shaped porous region may be provided at the outlet of the nozzle. Further, an expansion disk or other shape can discharge its snow pattern against a deflection plate to produce a desired dispersion of the snow particles.

Micro-drilled expansion members are also contemplated for use in the present invention. "Micro-drilled" as used herein is meant to refer to expansion member having multiple fine channels that are mechanically formed by drilling, piercing or the like. It is contemplated that such micro-drilled expansion members may have holes of up to about 300 microns in diameter, and preferably in the range of about 10 microns to about 200 microns.

The preferred cryogenic fluid is carbon dioxide, as it exhibits a benign character when applied to foodstuffs and is applicable to many cooling applications. However, it is to be understood that the invention is equally applicable to other cryogenic fluids which may be controlled to create a finely dispersed cryogen pattern through use of an expansion member positioned within a nozzle structure.

It is well known that carbon dioxide exhibits a "triple point" at a pressure of approximately 60 lbs. psig, at −70° Fahrenheit. As indicated above, liquid carbon dioxide is often stored at about 300 psig and about 0° Fahrenheit. When liquid carbon dioxide is fed at such pressure and temperature to a nozzle incorporating the invention hereof, it is preferred that the expansion member have a thickness and fine channel diameter which, given inlet and outlet pressures, enables the carbon dioxide liquid passing therethrough to reach the triple point at or near the outlet face of the expansion member.

As indicated above, the liquid carbon dioxide reaches the expansion member at about 0° Fahrenheit (from a storage container). It enters the channels of the member and commences expansion (due to the pressure differential thereacross), which expansion causes a cooling of the fluid. Given a sufficiently thick expansion member, the temperature reaches approximately −700° Fahrenheit and approximately 60 psig at or near the outlet surface of the expansion member, thereby providing conditions which enable creation of the snow particulate. The fine channel diameters restrict the size of the snow particles that are created. The pressure differential across the expansion member and vapor component serve as driving forces to cause the ejection of the snow particles.

In such manner, the liquid/vapor passing through the fine channels is converted to snow particles at or near the outlet side of the nozzle. It has been found, that even if the triple point occurs within the structure of the expansion member, that the substantial pressure differential between the inlet and outlet faces of the expansion member causes the snow particles and vapor to move through the fine channels in an unimpeded fashion.

Turning now to FIG. 1, nozzle 10 receives a liquid carbon dioxide flow through inlet 12. An expansion disk 14 (preferably porous stainless steel) is positioned at the exit end of nozzle 10 and is held in place by a retaining nut 16 which is threaded onto nozzle 10. Liquid carbon dioxide flowing into inlet 12 enters expansion disk 14, and experiences expansion during passage through the pores of expansion disk 14. Accordingly, snow is created at or near the outlet surface of the expansion disk 14 and exits therefrom as a result of the pressure differential thereacross.

Figure 1A:
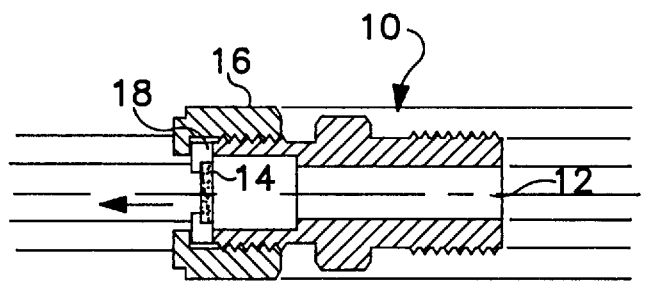
FIG. 1*a* is a modified version of the nozzle of FIG. 1, wherein a retaining ring is employed to restrain an expansion member positioned within the nozzle.

In FIG. 1a, an alternate version of the nozzle of FIG. 1 is illustrated and incorporates a retaining ring 18 about the periphery of expansion disk 14. Retaining ring 18 prevents a flow of liquid carbon dioxide around the edges of expansion disk 14 and enables nozzle 10 to accommodate various size disks in a "standard" disk holding device.

Figure 2:
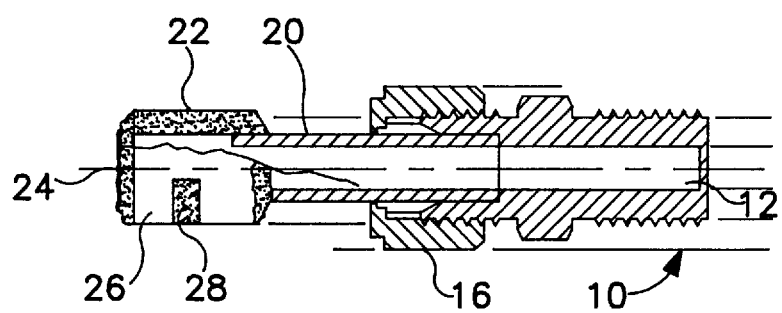
FIG. 2 is a sectional view of a further embodiment of a nozzle constructed in accordance with the invention hereof wherein a fan-shaped snow pattern is produced.

Turning to FIG. 2, the nozzle structure of FIG. 1 has been modified to enable the creation of a fan-shaped snow pattern. A tube 20 is inserted into the exit end of nozzle 10 and is secured thereto. A cap 22 having a semicircular porous region is affixed to the outlet end of tube 20, and its end portion 24 is sealed by a plate or other closure. As a result, when cryogenic fluid enters inlet 12, the only exit region which is available is through semi-circular porous region 28 which provides the desired fan shape of snow particulate.

The cap 22 may be pre-manufactured or made by sealing the outer circumference area 26 of a porous cap by abrading the porous material surface, closing the porous material by a shot blast or other peening process, by doctoring an epoxy hardening material on the outer surface or by some other sealing procedure.

Figure 3A:
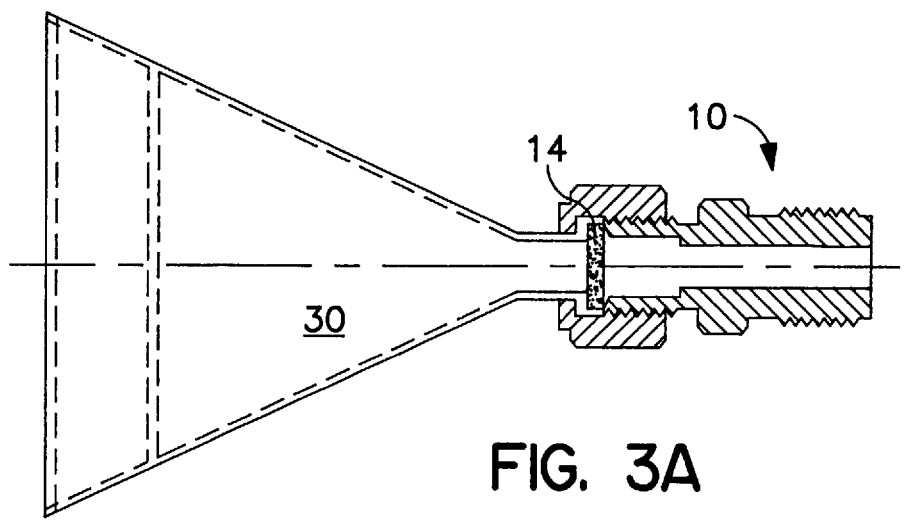
FIG. 3*a* is a top sectional view of the first embodiment nozzle which incorporates a horn to widen a snow pattern produced thereby.
Figure 3B:
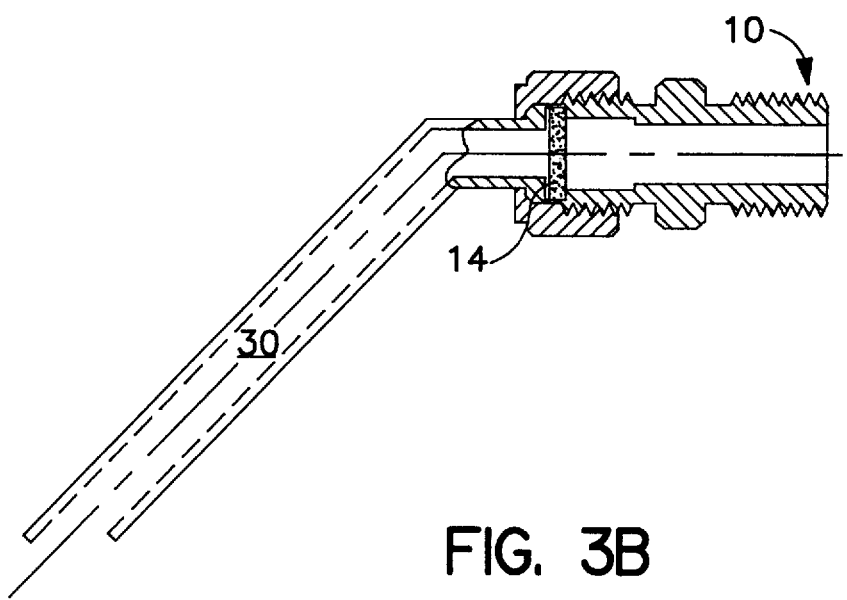
FIG. 3*b* is a side sectional view of the nozzle of FIG. 3*a*.

FIGS. 3a and 3b illustrate the positioning of a horn 30 at the outlet of nozzle 10 to provide a guiding/deflection of snow particulate which exits from expansion disk 14. Horn 30 not only provide a directionality for the carbon dioxide snow, but also prevents the generated snow from evaporating before it reaches the material to be cooled. Horn 30 is designed to be filled by the flow of snow and vapor so as to keep moisture or other condensable components which surround horn 30, from being drawn into and condensing inside horn 30. Such condensation can cause a blockage of nozzle 10.

The embodiments of the invention hereafter to be described each employ an intermediate pressure chamber to control the pressure on the outlet side of the expansion disk inserts. Back pressure on the exit side of the expansion insert reduces the pressure differential across the expansion disk insert. Since the exit side is pressurized the differential between the exit side pressure and the carbon dioxide triple point within the expansion disk is reduced. The provision of an intermediate pressure chamber allows the pressure on the inlet side to be reduced while still maintaining the carbon dioxide triple point at or near the exit surface of the expansion disk member.

The intermediate pressure chamber (i) allows the solid and vapor to be "piped" to a desired orientation, (ii) provides a pressure drop to enable a second expansion, (iii) enables the second expansion to be shaped to provide a desired outlet snow pattern, and (iv) enables a lower pressure drop across the second expansion to thereby produce lower velocity exiting snow and vapor.

An intermediate pressure chamber also prevents air from entering the vapor and snow stream until after that stream is in the desired form. Since moisture from air condenses in the cold vapor and snow stream, the frozen moisture can block and redirect the cold vapor and snow. Also, the fine snow produced by the expansion disk member does not agglomerate in the dry equilibrium environment produced in the intermediate pressure region enabling snow ejection to continue without plugging by the formation of dry ice.

Since the second expansion is from 20 psig (or less) to atmospheric, a lessened discharge velocity results than would occur if the expansion was from 300 psig to atmospheric (across the expansion member). The equilibrium pressure condition in the intermediate pressure chamber preferably ranges from a positive pressure above ambient to about 20 psig. At pressures higher than about 20 psig, it is more likely that the triple point (about 60 psig) will occur in the intermediate chamber (i.e. the low pressure outlet side) rather than during passage through the expansion disk member, and cause the intermediate pressure chamber to flood with liquid carbon dioxide. Further, an unstable pressure condition can exist which allows the liquid in the intermediate pressure chamber to reach the triple point and form solid carbon dioxide. Such a formation may block the second expansion outlet from the intermediate pressure chamber.

Figure 4:
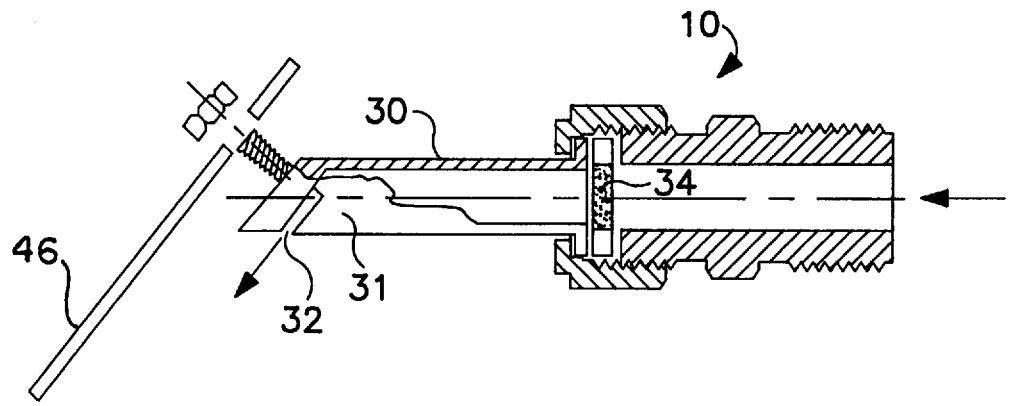
FIG. 4 is sectional view of another embodiment nozzle incorporating the invention hereof with an intermediate pressure chamber.

FIG. 4 illustrates the nozzle of FIG. 1a wherein an intermediate pressure chamber 30 has been appended to the outlet of nozzle 10. Intermediate pressure chamber 30 comprises a closed chamber 31 with a slot 32 for the exit of carbon dioxide vapor and snow particulate. The size of slot 32 controls the pressure within intermediate pressure chamber 30 and further aids in assuring that the triple point is reached during passage through the expansion member 34.

A plate 36 may be appended to the exit end of nozzle 10 to widen the pattern of snow which exits from slot 32.

Figure 5:
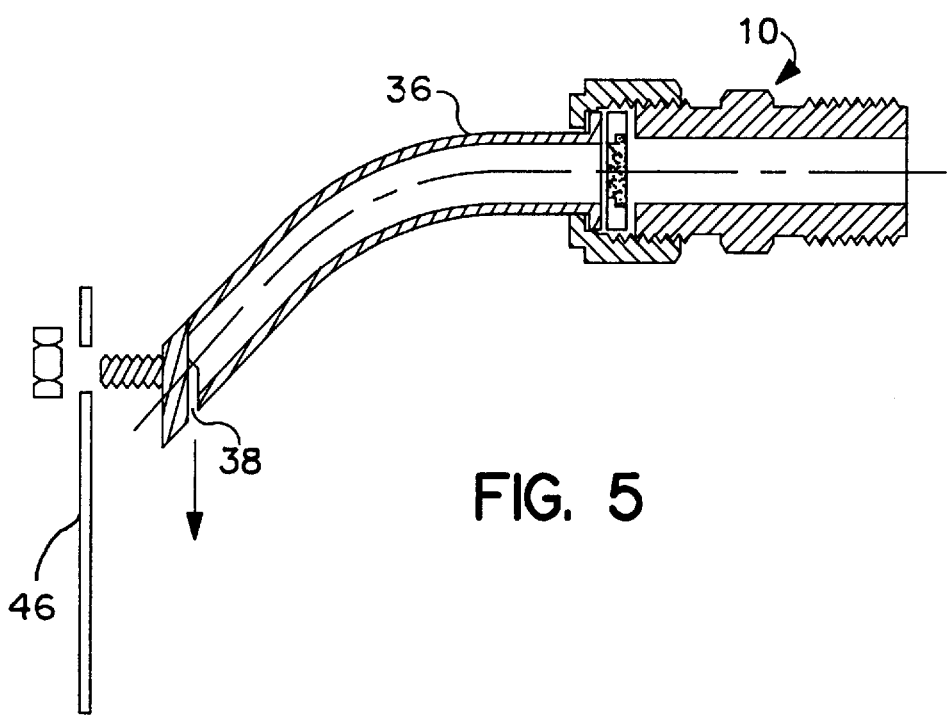
FIG. 5 is a revised version of the nozzle of FIG. 4 wherein a bend is provided in the intermediate pressure chamber to provide a direction change for the snow produced thereby.
Figure 6:
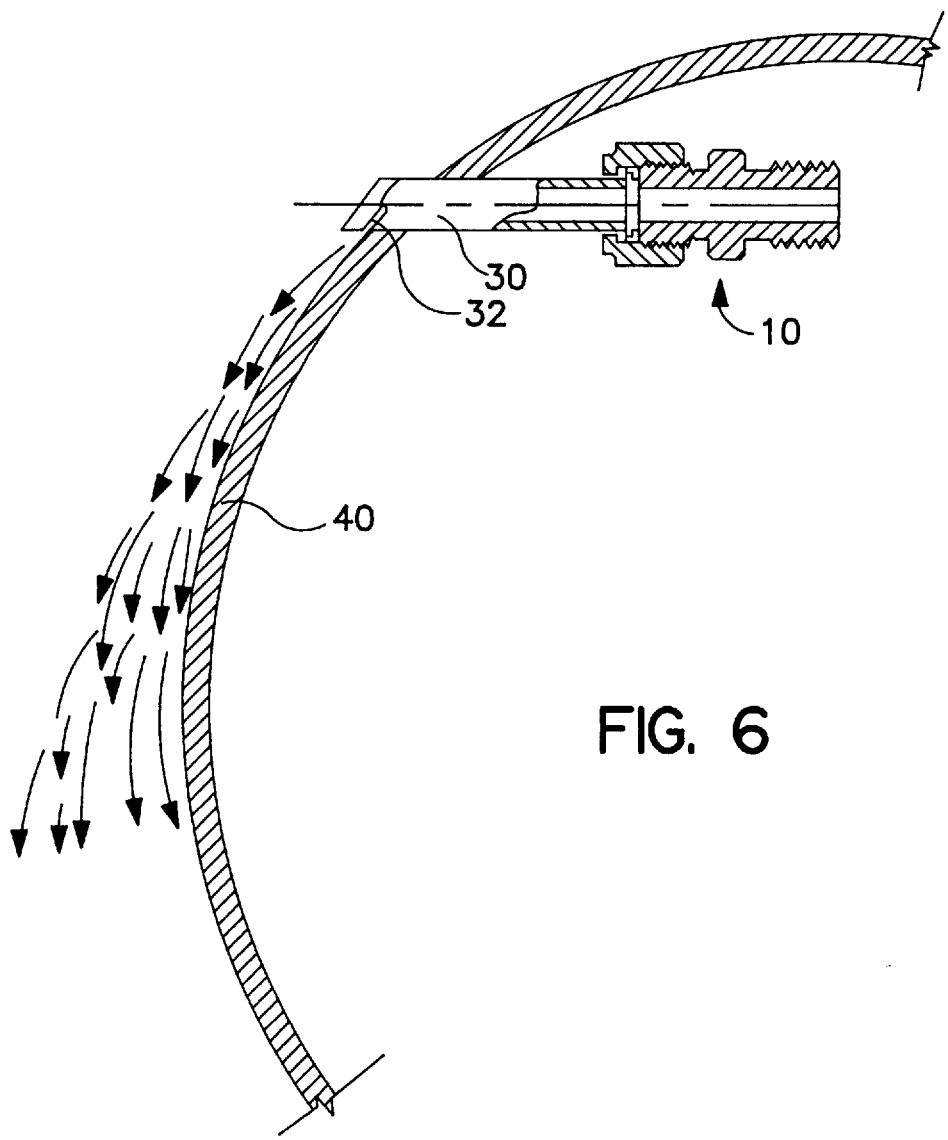
FIG. 6 illustrates the nozzle of FIG. 4, wherein the intermediate pressure region injects snow over a curved surface to achieve a spread of the snow pattern.

FIG. 5 shows a nozzle wherein an intermediate pressure chamber 36 is attached which exhibits a curved path to enable a change in direction of the snow discharged from slot 38. The snow pattern exiting from the version of nozzle 10 shown in FIG. 4 can be altered by the structure shown in FIG. 6. Therein, intermediate pressure chamber 30 extends through an opening in a curved surface 40 in such a manner that slot 32 causes the carbon dioxide vapor and snow pattern to exit in a generally tangential direction thereto. The resultant velocity of the exiting vapor and snow is spread by the pressure differential over curved surface 40. Accordingly, by adjusting the curvature of curved surface 40, the snow pattern exiting from slot 32 can be adjusted and redirected along a desired pathway.

Figure 7:
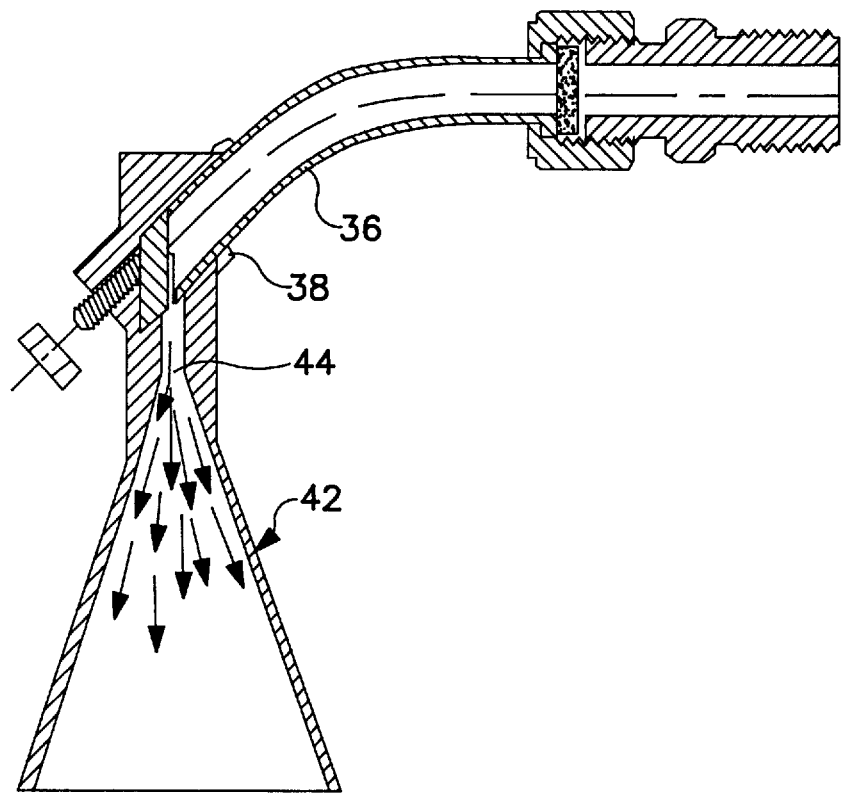
FIG. 7 illustrates the nozzle of FIG. 5 wherein a snow horn communicates with the outlet from the intermediate pressure chamber, the snow horn preventing the snow from mixing with and being evaporated by the surrounding atmosphere.

FIG. 7 illustrates the nozzle, as shown in FIG. 5, wherein a horn 42 has been connected to receive vapor and snow exiting from slot 38. When the vapor and snow enter inlet 44 to horn 42, the snow pattern tends to spread within the interior of horn 42 and its velocity also tends to decrease. Further, horn 42, by receiving the snow and vapor from intermediate pressure chamber 36 prevents a mixing of the snow and vapor with the surrounding atmosphere and preserves the snow up to the point of application.

FIGS. 8–10 are charts which show results obtained from tests performed on a nozzle formed in accord with FIG. 4, using various diameter stainless steel porous inserts. FIG. 8. illustrates the results obtained from a nozzle with a 0.022" exit slot width from the intermediate pressure chamber. FIGS. 9 and illustrate results obtained for 0.035" and 0.062" slot widths, respectively.

For each of the test nozzles, the following parameters were constant: slot angle—45°, porous insert thickness—1/16", pore sizes—5 mils, inlet pressure –295 psi. For each slot width, four different diameter porous inserts were tested to determine if an acceptable snow pattern would result (i.e., the triple point would be reached at or near the outlet surface of the expansion member).

In all of the tests, except test 4 in FIG. 8, acceptable snow patterns were achieved. In test 4 of FIG. 8, the intermediate pressure chamber flooded with liquid carbon dioxide and no snow was produced. The tests also demonstrated that the pressure in the intermediate chamber may be controlled by using different slot widths and channel sizes of the expansion member. As shown, lower pressures were achieved in the intermediate chamber by using larger slot widths, increasing the channel size of the expansion member, or a combination thereof. The tests, therefore, indicated that the snow pattern and snow/vapor exit velocities could be adjusted by variation of the aforementioned parameters to match a given application.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A system for producing a fine pattern of a cryogen for application onto a product, comprising:

a conduit for providing a pressurized flow of a cryogenic fluid;

a nozzle coupled to said conduit and having an outlet and an internal pathway between said conduit and said outlet; and an expansion member covering said pathway and providing multiple fine channels for said cryogenic fluid to pass to said outlet, whereby said fine pattern of cryogen is applied to a product being treated.

2. The system as recited in claim 1 wherein said expansion member is of a generally planar form, is mounted in said nozzle and is surrounded by a retainer.

3. The system as recited in claim 1 wherein said cryogenic fluid is carbon dioxide.

4. The system as recited in claim 3 wherein said pressurized flow of carbon dioxide fluid enters a solid phase during passage through said fine channels of said expansion member and exits therefrom as a fine snow pattern.

5. The system as recited in claim 3, wherein dimensions of said expansion member, fine channels within said expansion member, pressure of said pressurized flow of carbon dioxide and an outlet pressure are adjusted so as to cause a triple point of said carbon dioxide to occur at or near the outlet of said expansion member.

6. The system as recited in claim 1, wherein said expansion member comprises sintered stainless steel.

7. The system as recited in claim 1, wherein said expansion member comprises micro-drilled stainless steel.

8. The system as recited in claim 1, further comprising:

an intermediate pressure chamber coupled to said outlet of said nozzle, said intermediate pressure chamber having an exit opening which assures a presence of an intermediate pressure within said intermediate pressure chamber, upon a presence of said pressurized flow of said cryogenic fluid.

9. The system as recited in claim 8, further comprising exit diversion means for diverting snow particles and vapor exiting from said exit opening.

10. The system as recited in claim 9, wherein said exit diversion means is configured as a convex curved surface that is juxtaposed to said exit opening in a manner so as to receive an outflow of show particles from said exit opening in a direction that is substantially tangential to said convex curved surface.

11. The system as recited in claim 8, further comprising a horn coupled to said exit for directing a flow path of said fine snow pattern.

12. The system as recited in claim 1, further comprising a horn coupled to said outlet for directing a flow path of said fine snow pattern.

13. The system as recited in claim 1, wherein said expansion member is configured as having a closed end and all but a selected region of said expansion member is sealed to prevent flow therethrough of said cryogenic fluid, said selected region enabling a shaped flow of said fine snow pattern.

* * * * *